Oct. 26, 1965   H. F. BUNZE   3,213,683
AIRCRAFT CRITICAL ACCELERATION INDICATING DEVICE
Filed Feb. 27, 1962   3 Sheets-Sheet 1

INVENTOR.
HARRY F. BUNZE
BY
Edward A. Sokolski
ATTORNEY

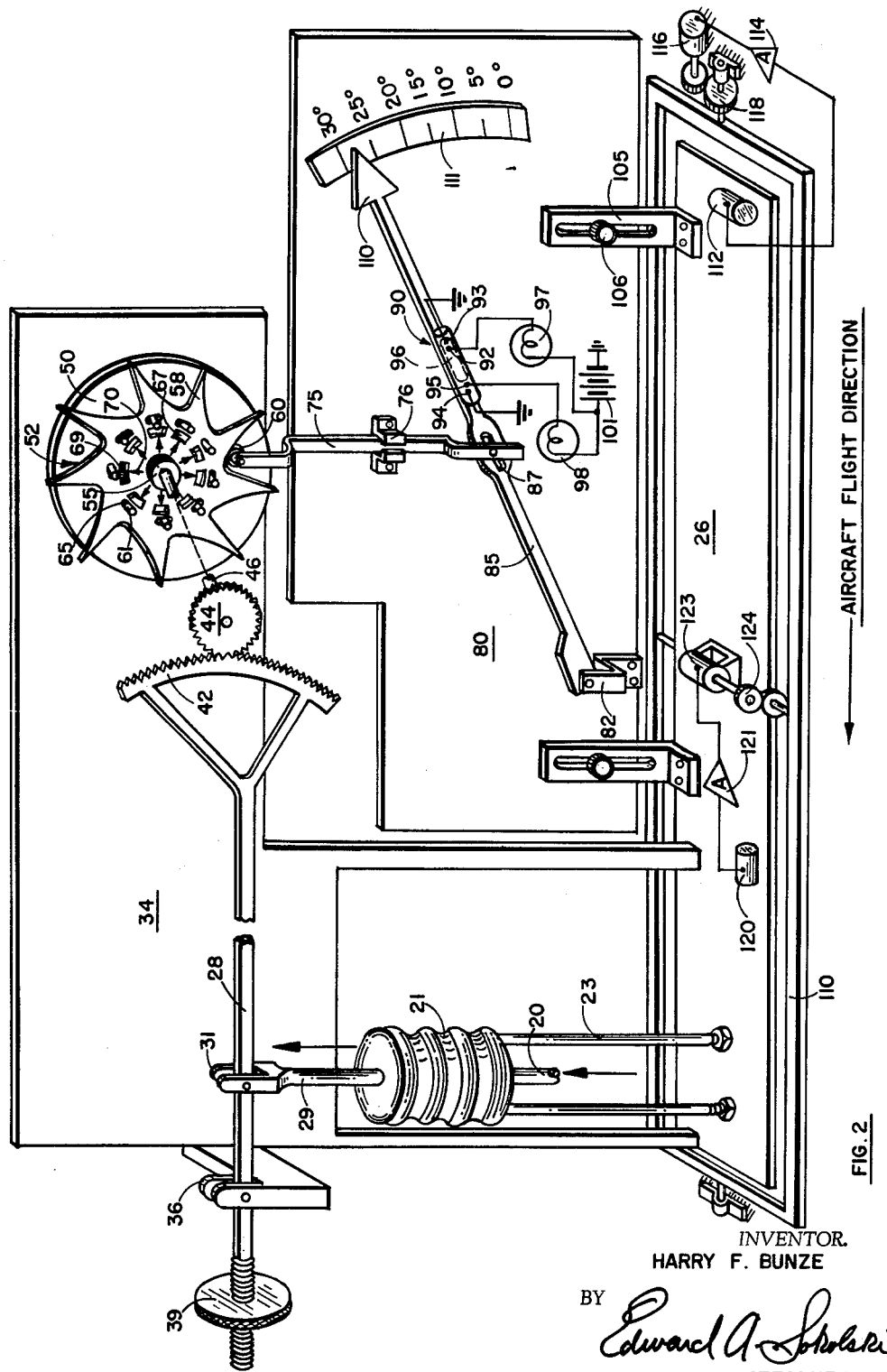

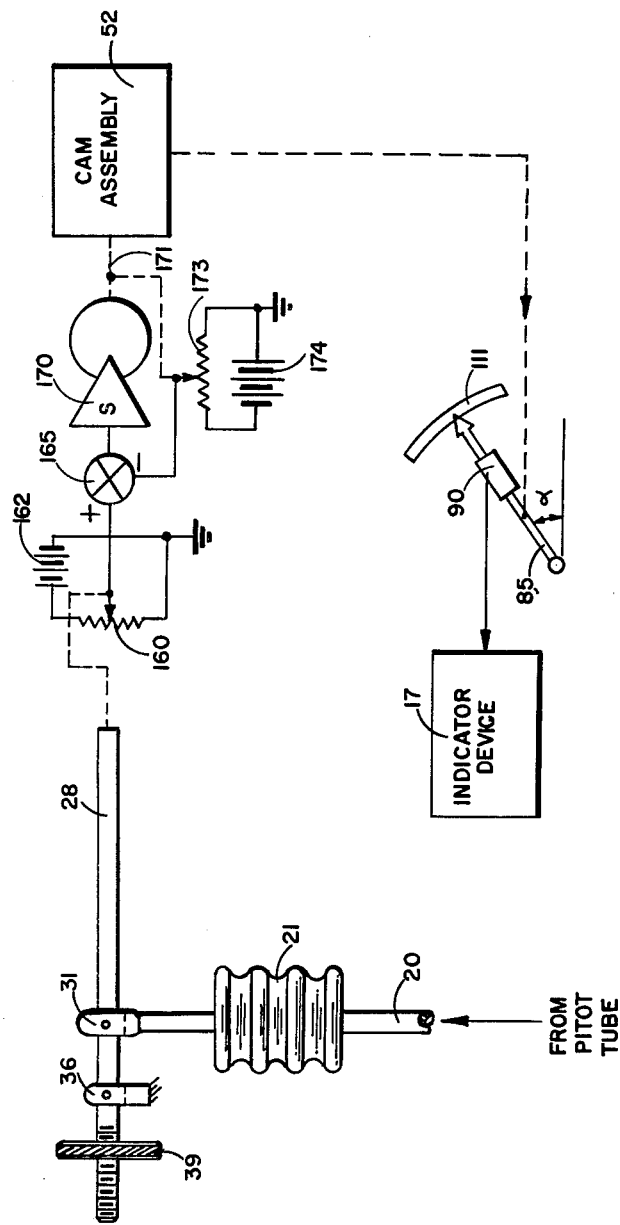

3,213,683
AIRCRAFT CRITICAL ACCELERATION
INDICATING DEVICE
Harry F. Bunze, Rolling Hills Estates, Calif.
(849 Serpentine Drive, Redlands, Calif.)
Filed Feb. 27, 1962, Ser. No. 175,988
14 Claims. (Cl. 73—178)

This invention relates to an aircraft critical acceleration indicating device and more particularly to a device capable of providing a continuous indication to a pilot during takeoff as to whether or not aircraft acceleration is adequate to permit a safe takeoff in the pre-flight calculated distance.

In making a takeoff, the pilot must assure himself that he has attained a sufficient airspeed to provide adequate aerodynamic lift on the aircraft to make the aircraft airborne in the runway distance. In reaching this determination, the relationship between the calculated thrust of the aircraft and the aircraft's gross weight as well as the air density at the particular takeoff location must be considered. From this information, the pilot calculates minimum airspeeds which must be attained at various points along the runway to assure lift off the ground in the required distance. During the takeoff, he then must monitor his indicated airspeed while he simultaneously checks his runway distance. This places the determination as to whether or not safe takeoff conditions have been achieved almost entirely on the pilot's split second judgment during a period of time when he has many other things to occupy his attention. The pilot further has no continuous indication that he is accelerating properly to reach the necessary airspeed and is not apprised of problems in this regard until he reaches a checkpoint along the runway. He thus may reach a point where it is difficult or impossible to abort the takeoff before he realizes that his airspeed is inadequate.

The device of this invention provides the pilot with a continuous positive indication of whether or not the aircraft acceleration is adequate to achieve the necessary airspeed in the predetermined takeoff distance. This indication is provided at all times during the takeoff from the instant he releases the brakes. The pilot need not check distance along the runway nor the indicated airspeed. As long as safe takeoff conditions are indicated by a simple visual or aural signal, he is assured that he will attain lift off in the required distance.

This end result is achieved by providing switch means responsive to the acceleration of the aircraft and varying the sensitivity of this switch means to aircraft forward acceleration by changing the angle at which the switch is positioned relative to the horizontal. The angular position of the switch is varied as a predetermined programmed function of the airspeed of the aircraft, the programmed values being predetermined for particular aircraft takeoff conditions. The switch includes an electrically conductive proof mass free to move within a container having switch contacts mounted therein, the container being angularly adjusted in accordance with changes in airspeed. The proof mass alternatively closes a first set of switch contacts if the sensed acceleration reaches a predetermined critical value or a second set of contacts if it is below this value. An indicator device is provided to translate the information indicated by the condition of the switch contacts into an appropriate form for use by the pilot. In essence, the acceleration sensitivity of the switch is controlled by varying the effect of the acceleration of gravity on the proof mass, this being accomplished by changing the orientation of the proof mass relative to the horizontal in accordance with a signal programmed as a function of aircraft airspeed.

In the device of the invention, a mechanical drive signal in accordance with aircraft airspeed is derived from the output of the aircraft's airspeed sensor by transducer means, and this mechanical signal is connected to drive an airspeed programming device which feeds a predetermined mechanical drive signal to an acceleration responsive switch for each airspeed signal fed thereto. The acceleration responsive switch is pivotally mounted relative to the horizontal and is driven by the programming device to vary its angular position relative to the horizontal. The acceleration responsive switch provides a first switching signal to an electrical indicator device when the sensed acceleration of the aircraft is of at least a predetermined minimum value or alternatively a second switching signal when the sensed acceleration is below the predetermined minimum value.

The device of this invention thus is a simple, yet highly effective means for providing the pilot with a constant positive indication of whether or not the acceleration and airspeed conditions of his aircraft are adequate for a safe takeoff.

It is therefore an object of this invention to increase the safety of aircraft takeoffs.

It is another object of this invention to facilitate aircraft takeoffs.

It is a further object of this invention to provide a continuous indication to the pilot during takeoff as to whether or not the thrust-airdrag-acceleration relationship for the instantaneous aircraft airspeed will make for a safe takeoff.

It is another object of this invention to provide an immediate indication to the pilot during takeoff of malfunctions of the aircraft or improper loading or adjustment thereof which might jeopardize a safe takeoff.

It is still another object of this invention to provide simple yet highly effective means for monitoring the aircraft velocity and acceleration conditions at all times during takeoff, thereby relieving the pilot of the necessity for checking the relationship of these conditions in assuring safe takeoff.

Other objects of this invention will become apparent from the following description taken in connection with the accompanying drawings of which:

FIG. 2 is a schematic diagram illustrating a first embodiment of the device of the invention;

FIG. 4 is a schematic diagram of a third embodiment of the device of the invention.

Figure 1:
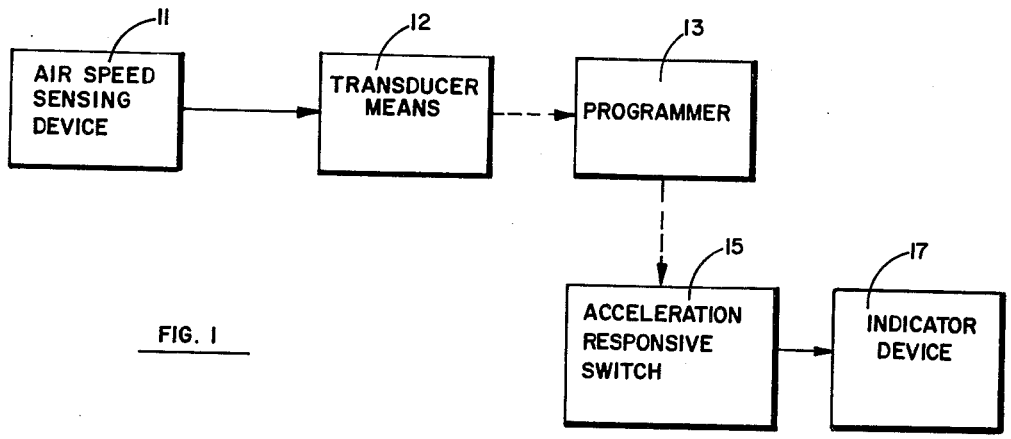
FIG. 1 is a block diagram illustrating the basic operation of the invention.

Referring to FIG. 1, a block diagram illustrating the basic operation of the device of the invention is shown. The airspeed of the aircraft is sensed by airspeed sensing device 11 which may, for example, comprise a pitot tube having an air pressure output signal in accordance with airspeed. The sensed airspeed signal from sensing device 11 is fed to transducer means 12 where it is converted to a mechanical actuation signal which is utilized to drive programmer 13. Various means may be utilized to transduce the airspeed signal as to be explained in connection with the embodiments of the device of the invention illustrated in FIGS. 2, 3, and 4. Airspeed programmer 13 produces a mechanical output signal having predetermined values for various values of airspeed input drive signals fed thereto. Airspeed programmer 13 is adapted to be adjusted to produce various predetermined programmed outputs in any particular aircraft for various aircraft loading and air density conditons. As to be explained further on in the specification, the programmer must be designed to produce output signals for various values of input drive representing aircraft airspeed, these signals representing an angular displacement, in accordance with calculations made for the particular aircraft in terms of thrust to weight ratio, air density, and aircraft total drag. The angular displacement signal from programmer 13 is fed to acceleration responsive switch 15 to control the angle of this switch relative to the horizontal. Acceleration responsive switch 15 comprises a container having an electrically conductive freely movable proof mass enclosed therein. This proof mass may be a conductive liquid such as mercury. The container includes a separate pair of contacts positioned at each end thereof which will alternatively be closed depending upon whether the proof mass is forced by the acceleration of the aircraft acting against the force of gravity towards one end of the container or maintained towards the other end of the container by the gravity force acting thereon. Whichever of these two forces acting on the mass is greater for the particular angular position of the container will determine which position the mass will assume and which pair of contacts will be closed. The output of the acceleration responsive switch 15 is fed to indicator device 17 which provides a separate indication for each pair of switch contacts. A visual or aural GO signal is provided for the pair of contacts closed when the aircraft acceleration force exceeds the component of gravity force acting on the proof mass, and an ABORT signal is provided in conjunction with the pair of contacts closed when the component of gravity force exceeds the aircraft acceleration force.

Referring now to FIG. 2, a first embodiment of the device of the invention is illustrated. An air pressure signal from the aircraft's pitot tube is fed through conduit 20 to bellows 21. The bottom portion of bellows 21 is fixedly attached to stable platform 26 by means of support rods 23. The bellows is expanded and contracted in accordance with the air pressure signal received from the pitot tube minus the external static pressure on the bellows. The top portion of the bellows is therefore driven vertically in accordance with the dynamic component of the received pressure signal. The top portion of the bellows is connected to drive shaft 28 by means of rod 29 which is fixedly attached to the bellows at one end thereof and to shaft 28 through pivot mount 31 at the other end thereof. Shaft 28 is attached to pivot mount 31 for pivotal motion about the horizontal. Shaft 28 is mounted for pivotal motion about the horizontal on support plate 34 by means of pivotal mount 36 which is fixedly attached to the support plate.

Tare weight adjustment knob 39 is threadably attached to the end of shaft 28 and is adjusted to counterbalance the moment produced by shaft 28 about pivotal mount 36. This adjustment is necessary to remove any significant weight load on bellows 21 which might impair the accuracy of its response to the pressure input signal.

Gear section 42 is fixedly attached to the end of shaft 28 and engages pinion gear 44. Pinon gear 44 is fixedly supported on drive shaft 46 which is connected to rotatably drive cam plate support 50. Cam plate support 50 is rotatably mounted on support plate 34 by means of a bearing (not shown).

Cam plate 52 has an aperture in the center thereof (not shown) and is removably attached to cam plate support 50 by means of nut 55. Cam plate 52 includes a plurality of cam spokes 58 which are each shaped in accordance with a predetermined contour which is determined for particular aircraft load conditions as to be explained further on in the specification. When nut 55 is loosened, the cam plate 52 may be pulled out and rotated relative to cam plate support 50 to bring any one of the spokes 58 into engagement with roller 60. The spokes are brought into the approximately correct position by means of guide pins 61 which project from support 50 and fit into elongated apertures 65 formed in the cam plate. Windows 67 are formed in the cam plate opposite the spokes. Gage lines 69 are etched on the surface of cam plate support 50 which appear through the window positioned at the top of the cam plate. An indicator pointer 70 is etched in the cam plate for each window. By means of the pointers and etched gage, the cam plate may be adjusted relative to the cam plate support within the range of the elongaed apertures 65 to compensate for variations in air density at various altitudes which would vary the take-off conditions. This adjustment is made prior to take-off.

Roller 60 is maintained in abutment against plate 52 by magnetic attraction, roller 60 being permanently magnetized and plate 52 being fabricated of magnetic material. Roller 60 is rotatably attached to drive rod 75. Drive rod 75 is maintained vertical by means of guide 76 in which the rod slides, guide 76 being fixedly attached to back plate 80.

Acceleration switch support bar 85 is pivotally attached to drive rod 75 and pivotally attached to back plate 80 by means of support bracket 82 on which the drive rod is pivotally mounted, the support bracket being fixedly attached to the back plate. An elongated slot 87 is provided in bar 85 where it joins with rod 75 to allow for horizontal displacement of this juncture with vertical motion of the rod. Acceleration sensing switch 90 is fixedly attached to support bar 85 so that its sensing axis coincides with the longitudinal axis of the support bar. Acceleration switch 90 is a mercury switch having a first pair of contacts 92 and 93 on one end thereof, a second pair of contacts 94 and 95 on the other end thereof, and a mercury proof mass contact 96 which alternatively closes one or the other of the contact pairs. The first pair of contacts are closed when the mercury is closer to the end of the switch on which they are located and alternatively the second pair of contacts are closed when the mercury mass 96 is closer to the end of the switch on which they are located. A first indicator lamp 97 is connected in circuit with the first pair of contacts and a second indicator lamp 98 is connected in circuit with the second pair of contacts. Power from power source 101 will light lamp 97 when switch contacts 92 and 93 are closed by the mercury or alternatively will light lamp 98 when switch contacts 94 and 95 are closed.

Back plate 80 is attached to stable platform 26 by means of adjustable brackets 105. When knurled knobs 106 are loosened, back plate 80 may be moved vertically relative to the platform and support plate 34 to provide a predetermined initial angle α between support bar 85 and the horizontal as indicated by pointer 110 on scale 111 which is etched on back plate 80. When this initial setting has been made, knurled knobs 106 are tightened down. The details as to how this angle α is derived for various aircraft load conditions will be explained further on in the specification.

Support plate 34, back plate 80 and bellows 21 are all mounted on stable platform 26 to assure that the system will be maintained horizontal, as the switch angle α must be referenced against the horizontal axis at all times for proper operation. Platform 26 is stabilized about the aircraft's roll and pitch axes. Platform 26 is mounted in gimbal 110 for rotation about the pitch axis. Gimbal 110 is mounted on the aircraft's frame for rotation about the aircraft's roll axis. Deviations of the platform from the horizontal about the roll axis are sensed by gyroscope 112. This gyroscope is gimbal mounted with its case attached to the platform. The rotor tends to remain stabilized in inertial space by virtue of gyroscopic action. A pickoff on the case senses any relative motion between rotor and case and therefore will sense departure of the platform from the horizontal. Such gyroscopic devices are well known in the art. The output signal from gyroscope 112 is appropriately detected and amplified in amplifier 114, the output of which is utilized to drive motor 116. The output shaft of motor 116 is connected to drive gear train 118 which in turn drives gimbal 110 to maintain platform 26 level about the roll axis. The platform is similarly stabilized about the pitch axis by means of gyroscope 120 operating in conjunction with amplifier 121, motor 123, and gear train 124.

The device of the invention operates as follows: Prior to takeoff, the pilot sets one of the cam plate spokes 58 in position to drive roller cam 60. This spoke selection is made on the basis of aircraft load conditions by consulting an appropriate chart, the derivation of which will be explained further on in the specification. The pilot also consults a second chart which indicates various initial settings for the angle $\alpha$ for various aircraft thrust to load ratios. He then sets back plate 80 on brackets 105 to produce this desired initial angle as read on etched scale 111. Finally, cam plate 52 is rotated slightly (within the range of elongated apertures 65) to set pointer 70 relative to gage 69 in accordance with the altitude of the runway. This adjustment is to compensate for differences in air density at different altitudes and slightly offsets the cam to accomplish such compensation.

In the early stages of takeoff, airspeed is relatively low and a relatively small pressure input signal is received by bellows 21 from the pitot tube. Support bar 85 therefore receives little actuation signal from drive rod 75 and the support bar and switch 90 remain close to their initial angular setting relative to the horizontal. At these early stages of takeoff, relatively high aircraft acceleration is required to drive mercury mass 96 to the righthand end of the switch to close contacts 92 and 93 in the face of the relatively high component of gravity acting on the mercury mass. As airspeed increases, bellows 21 is expanded and drives shaft 28 upwards. This causes pinion gear 44 to rotate which in turn rotates cam plate support 50 and cam plate 52 which is attached thereto. The gear ratio between gear section 42 and pinion gear 44 can be determined for any particular design by techniques well known in the art. With clockwise rotation of cam plate 52 as airspeed increases, drive rod 75 is driven downward to drive support bar 85 and change the angle $\alpha$ which is assumed by the acceleration sensing switch 90 relative to the horizontal. This effectively increases the acceleration sensitivity of the switch by providing a smaller component of gravity acting on the mercury mass 96 counter to the acceleration of the aircraft. As the aircraft's airspeed increases, it therefore takes less and less acceleration of the aircraft to maintain the mass at the righthand end of the switch to close contacts 92 and 93. The GO indicator light 97 will be kept on, therefore, as long as the airspeed and the acceleration of the aircraft are both adequate during the entire takeoff run to achieve the necessary airspeed in the allotted runway distance.

To achieve the desired end results, it is necessary, of course, that an accurate chart be prepared to enable the pilot to make the initial angle setting and that the various cam plate spokes 58 be contoured to represent different aircraft loading conditions that will be encountered. This information is derived as follows: It is well known in the art that on takeoff:

$$T_N = T_0 - \tfrac{1}{2} C_D \rho S V^2 - uW \quad (1)$$

and $$T_N = \frac{Wa}{g} \quad (2)$$

where $T_N$=Aircraft's net thrust available for acceleration
$T_0$=Aircraft engines' installed thrust
$C_D$=Aerodynamic drag co-efficient
$S$=Aircraft's wing area
$V$=Aircraft airspeed
$\rho$=Air density
$u$=Friction co-efficient of aircraft wheels on runway
$W$=Aircraft's gross weight
$a$=Aircraft acceleration
$g$=Acceleration of gravity By substituting equation (1) in equation (2), therefore $$T_0 - \tfrac{1}{2} C_D \rho S V^2 - uW = \frac{Wa}{g} \quad (3)$$

and $$a = g\left(\frac{T_0}{W} - \frac{C_D \rho S V^2}{2W} - u\right) \quad (4)$$

when $V = 0$, then $$a = g\left(\frac{T_0}{W} - u\right) \quad (5)$$

Referring to FIG. 2, it can be shown that $$W_1 \sin \alpha - (W_1 \cos \alpha) u_1 = \frac{W_1 a_1}{g} \quad (6)$$

where $W_1$=Weight of mercury mass 96
$\alpha$=Angle support bar 85 forms with the horizontal
$u_1$=Friction co-efficient of mercury on container
$a_1$=Component of aircraft acceleration acting on mercury mass Transposing equation (6) in terms of $a_1$ $$a_1 = g[\sin \alpha - \cos \alpha u_1] \quad (7)$$

but $$a_1 = a \cos \alpha \text{ (for equilibrium condition)} \quad (8)$$

Therefore by combining equations (5), (7), and (8)

$$g \cos \alpha\left(\frac{T_0}{W} - u\right) = g[\sin \alpha - (\cos \alpha) u_1] \quad (9)$$

simplifying $$\frac{T_0}{W} = \frac{\sin \alpha - u_1 \cos \alpha}{\cos \alpha} + u = \tan \alpha - u_1 + u \quad (10)$$

The angle $\alpha$ which satisfies equation (10) is the initial angle at which the pilot sets support bar 85 by adjusting back plate 80. A chart is prepared utilizing this equation to give the pilot angular settings for various thrust to weight ratios, $T_0/W$.

When V is not zero, i.e., during takeoff, then substituting equations (4) and (7) in equation (8)

$$\cos \alpha g\left(\frac{T_0}{W} - \frac{C_D \rho S V^2}{2W} - u\right) = g[\sin \alpha - \cos \alpha u_1] \quad (11)$$

simplifying $$\tan \alpha = \frac{T_0}{W} - \frac{C_D \rho S V^2}{2W} - u + u_1 \quad (12)$$

The contours of the spokes 58 of cam plate 52 are formed in accordance with equation (12), each spoke representing different aircraft loading conditions. The spokes are contoured so that for the particular conditions each represents, support bar 85 will be driven to assume angular positions $\alpha$ relative to the horizontal for the aircraft's sensed airspeed in accordance with equation (12).

It can readily be seen that the device of the invention can be utilized to equal advantage in assuring proper deceleration conditions on landing. In accomplishing this end result, however, the support bar 85 must be reoriented so that its positioning relative to the aircraft flight direction is exactly in a 180 degree relationship to that utilized for takeoff, with the cam being rotated counterclockwise rather than clockwise.

Figure 3:
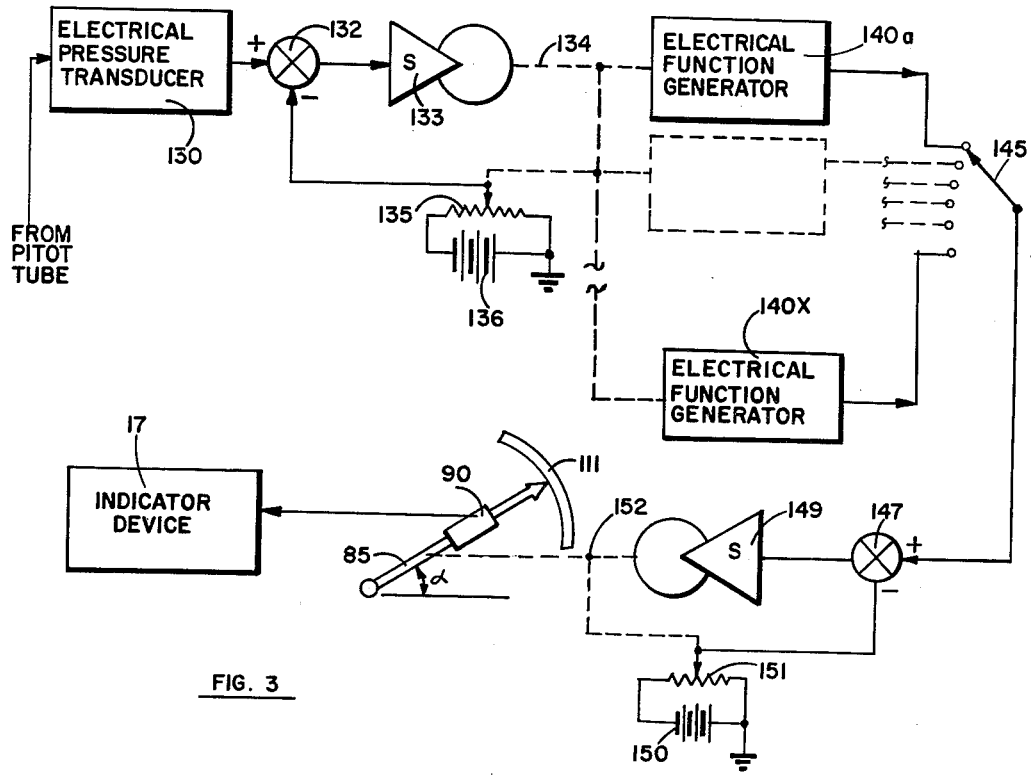
FIG. 3 is a functional block diagram of a second embodiment of the device of the invention.

Referring to FIG. 3, a second embodiment of the device of the invention is shown. This embodiment utilizes electrical devices to replace a number of the mechanical devices of the embodiment of FIG. 2. The pressure signal from the pitot tube is fed to electrical pressure transducer 130 which converts this pressure signal to an electrical output signal. Devices for performing this transducing function are commercially available. One of these devices is described, for example, in Patent No. 2,751,576 for a Closed Cycle Pressure Transducer issued June 19, 1956, to D. G. Soergel et al. The output of pressure transducer 130 which is a D.-C. signal is fed to summing device 132, the output of which is in turn fed to servo motor 133.

The motor of servo motor 133 rotates output shaft 134 in accordance with the input thereto from summing device 132. A negative position feedback signal is fed to summing device 132 from the arm of potentiometer 135. The ends of potentiometer 135 are connected across D.-C. reference source 136. The arm of the potentiometer is mechanically connected to output shaft 134. A voltage is therefore produced at the arm of potentiometer 135 in accordance with the rotation of this output shaft. This voltage is fed to the summing device 132 in opposite polarity to the input fed thereto from the pressure transducer. Summing device 132 will only produce an output signal to drive servo motor 133 when there is a difference between the voltages fed thereto from the transducer and the potentiometer. Output shaft 134 will therefore be rotated until these two voltages are equal and then will stop. In this manner, the output shaft 134 is positioned to a given predetermined angular position for each value output signal from pressure transducer 130.

Output shaft 134 is connected to drive the input shafts of a plurality of electrical function generators 140a–140x. Each of these function generators is a potentiometer wound to represent a different aircraft loading condition. The electrical characteristics of these function generators are determined in accordance with equation (12), these characteristics being such as to produce an output drive signal to servo motor 149 to drive support bar 85 to an angular position $\alpha$ which corresponds to the airspeed indicated by the equation for the particular load conditions represented. The design of function generator potentiometers for accomplishing this end result is described in detail in chapter 6, pages 313 et seq., of Electronic Analog Computers by Korn and Korn, published in 1956 by McGraw-Hill Book Company. The particular function generator which corresponds to the existent aircraft loading conditions is selected by the pilot prior to takeoff by means of selector switch 145. The output of the selected function generator is fed through switch 145 to summing device 147 and thence to servo motor 149. Position feedback is provided to summing device 147 by means of potentiometer 151 and D.-C. reference source 150 to indicate the position of output shaft 152 so that this shaft will be driven to and maintained at a different angular position for each input signal from the function generators, such operation being similar to that described in connection with output shaft 134.

Output shaft 152 is connected to drive support bar 85 to an angular position $\alpha$ in accordance with the output signal from the function generator. Acceleration sensing switch 90 is connected to indicator device 17. The support bar 85, acceleration sensing switch 90, and the indicator device 17 for the embodiment of FIG. 3 are all similar in structure and operation to the corresponding elements described in connection with the embodiment of FIG. 2.

The embodiment of FIG. 3 provides electrical means for carrying out the principles of the invention for use in situations where this type of mechanization is better suited to application demands.

Referring now to FIG. 4, a third embodiment of the device of the invention is illustrated. Similarly to the embodiment illustrated in FIG. 2, the pressure signal from the pitot tube is fed through conduit 20 to bellows 21 which in turn drives shaft 28 to cause it to rotate pivotally on pivotal mount 36. Shaft 28 is connected to drive the arm of potentiometer 160. D.-C. reference source 160 is connected across the ends of potentiometer 160. The voltage appearing at the arm of the potentiometer therefore is a D.-C. voltage, the magnitude of which is in accordance with the position of shaft 28. The voltage appearing at the arm of potentiometer 160 is fed to summing device 165, the output of which is fed to drive servo motor 170. The output shaft of servo motor 170 is connected to drive shaft 171 which drives cam assembly 52 and position feedback potentiometer 173. Voltage reference 174 is connected across potentiometer 173 and the voltage at the arm of the potentiometer is a negative voltage in accordance with the position of shaft 171. This voltage is fed to summing device 165 to be added with the voltage fed thereto from potentiometer 160. An output signal will be fed to servo motor 170 only when the two signals fed to summing device 165 are not equal. Shaft 171 therefore will assume a particular angular position for each value of signal fed to the summing device from potentiometer 160. Cam assembly 52 corresponds in structure and function to the cam plate shown and described in connection with the embodiment of FIG. 2. The cam assembly is driven by shaft 171 to produce a mechanical drive signal in response to aircraft airspeed in accordance with equation (12) as already explained in detail. This mechanical signal is connected to drive support bar 85 to vary angle $\alpha$. Acceleration sensing switch 90 is connected to indicator device 17. The structure and operation of the cam assembly 52, support bar 85, sensing switch 90, and indicator device 17 are as illustrated in FIG. 2 and described in connection therewith.

The device of the invention thus provides a simple yet highly effective means for providing continuous information to the pilot during aircraft takeoff as to whether or not acceleration is adequate to reach the necessary airspeed to provide a takeoff in the allowable runway distance.

While the invention has been described and illustrated in detail, it is to be clearly understood that this is intended by way of illustration and example only and is not by way of limitation, the spirit and scope of the invention being limited only by the terms of the appended claims.

I claim:
1. A device for continuously indicating whether or not aircraft acceleration and airspeed are adequate to make for a safe takeoff comprising
    an acceleration sensing switch mounted on said aircraft to sense forward acceleration thereof,
    means for supporting said switch on said aircraft for pivotal motion relative to the horizontal,
    and means responsive to airspeed for automatically adjusting the angular position of said supporting means relative to the horizontal in accordance with airspeed.

2. The device as recited in claim 1 wherein said means for automatically adjusting the angular position of said supporting means comprises
    means for sensing the airspeed of said aircraft,
    and means responsive to the output of said sensing means for generating a mechanical displacement signal as a programmed function of aircraft airspeed for a predetermined aircraft loading.

3. The device as recited in claim 2 wherein said means for generating a mechanical displacement signal includes a cam plate having a plurality of spokes formed therein each contoured to represent a different aircraft loading condition.

4. In an aircraft critical acceleration indicating device,
means for sensing the airspeed of said aircraft,
switch means responsive to the acceleration of said aircraft, said switch means being mounted in said aircraft for pivotal motion relative to the horizontal,
an airspeed programmer,
drive means responsive to said airspeed sensing means for driving said programmer in accordance with sensed airspeed,
said airspeed programmer being connected to drive said switch means to vary the angular position thereof relative to the horizontal in accordance with a predetermined program as a function of airspeed,
and an indicater device responsively connected to the output of said switch means,
said indicator device including means for alternatively producing a first predetermined signal in response to sensed acceleration of at least a predetermined critical value, or a second predetermined signal in response to sensed acceleration below this critical value.

5. The device as recited in claim 4 wherein said programmer includes a cam plate having a plurality of spokes each contoured to represent a different aircraft loading conditon program for airspeed.

6. In combination,
an aircraft,
means for generating an output signal in accordance with the airspeed of said aircraft,
program means responsively connected to receive the output of said generating means,
said program means being adapted to produce an output signal in accordance with the weight of said aircraft programmed as a function of aircraft airspeed,
acceleration responsive switch means responsive to the acceleration of said aircraft,
said switch means including a container having a pair of switch contacts mounted at opposite ends thereof and an electrically conductive proof mass mounted for freedom of motion within said container,
means for mounting said container pivotally on said aircraft at an initial predetermined angle relative to the horizontal, the output of said program means being connected to vary said angle in response to aircraft airspeed, and indicator means responsive to the output of said switch means.

7. The device as recited in claim 6 wherein said mounting means comprises a support bar and a back plate,
said support bar being pivotally mounted on said back plate,
said back plate being connected to said aircraft for vertical adjustment relative thereto.

8. The device as recited in claim 7 and additionally comprising a stable platform attached to said aircraft,
said generating means, said program means, and said back plate being mounted on said platform.

9. In combination,
an aircraft,
means for generating an output signal in accordance with the airspeed of said aircraft,
program means responsively connected to receive the output of said generating means,
said program means being adapted to produce an output signal in accordance with the weight of said aircraft programmed as a function of aircraft airspeed,
acceleration responsive switch means responsive to the acceleration of said aircraft,
said switch means being pivotally mounted on said aircraft at an initial predetermined angle relative to the horizontal,
the output of said program means being connected to automatically vary said angle in response to aircraft airspeed,
and indicator means responsive to the output of said switch means.

10. The device as recited in claim 9 wherein said program means comprises a cam plate rotatably driven by said generating means.

11. The device as recited in claim 9 wherein said program means comprises an electrical function generator.

12. The device as recited in claim 9 wherein said switch means includes an electrically conductive liquid and a container, said liquid being contained in said container.

13. In an aircraft critical acceleration indicating device,
means for sensing the airspeed of said aircraft,
a support bar mounted in said aircraft for pivotal motion relative to the horizontal,
switch means responsive to the acceleration of said aircraft mounted on said support bar,
means responsive to said airspeed sensing means for automatically positioning said support bar relative to the horizontal to vary the acceleration sensitivity of said switch means in accordance with a predetermined program and as a function of the sensed airspeed, and
an indicator device responsively connected to the output of said switch means.

14. The device as recited in claim 13 and additionally including a stable platform attached to said aircraft, said positioning means and said support bar being mounted on said platform.

References Cited by the Examiner
UNITED STATES PATENTS

| | | | |
|---|---|---|---|
| 1,451,923 | 4/23 | Pierce | 73—178 X |
| 2,101,837 | 12/37 | Blanchett | 33—206.5 X |
| 2,182,706 | 12/39 | Shanley | 73—178 X |
| 2,202,987 | 6/40 | Egenas | 73—178 |
| 2,346,798 | 4/44 | Summers | 73—178 X |
| 2,789,362 | 4/57 | Maroth | 33—206.5 |
| 2,922,982 | 1/60 | Hoekstra | 73—178 X |
| 2,947,502 | 8/60 | Highley | 73—178 X |
| 3,077,110 | 2/63 | Gold | 73—178 |

OTHER REFERENCES

Garland J. Morris et al.: "Description . . . of an Instrument for Take-Off," Technical Note 3252, published November 1954 by the National Advisory Commitee for Aeronautics, Scientific Library No. TL521 U58. Copy in Group 430, 73–178T.

LOUIS R. PRINCE, *Primary Examiner.*

ROBERT B. HULL, *Examiner.*